(12) United States Patent
Maze et al.

(10) Patent No.: US 11,871,092 B2
(45) Date of Patent: Jan. 9, 2024

(54) METHOD AND APPARATUS FOR ENCAPSULATING DERIVED TRACKS

(71) Applicant: CANON KABUSHIKI KAISHA, Tokyo (JP)

(72) Inventors: Frédéric Maze, Langan (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 17/438,655

(22) PCT Filed: Mar. 4, 2020

(86) PCT No.: PCT/EP2020/055632
§ 371 (c)(1),
(2) Date: Sep. 13, 2021

(87) PCT Pub. No.: WO2020/187564
PCT Pub. Date: Sep. 24, 2020

(65) Prior Publication Data
US 2022/0159352 A1    May 19, 2022

(30) Foreign Application Priority Data
Mar. 18, 2019  (GB) .................................... 1903683

(51) Int. Cl.
*H04N 21/854*  (2011.01)
*H04N 21/2343* (2011.01)
*H04N 21/845*  (2011.01)

(52) U.S. Cl.
CPC .............. *H04N 21/85406* (2013.01); *H04N 21/234345* (2013.01); *H04N 21/8455* (2013.01)

(58) Field of Classification Search
CPC ..... H04N 21/85406; H04N 21/234345; H04N 21/8455; H04N 21/4402; H04N 21/84;
(Continued)

(56) References Cited

FOREIGN PATENT DOCUMENTS

GB  2560921 A  *  3/2018  ............. H04N 19/46
GB  2560921 A     10/2018

OTHER PUBLICATIONS

David Singer et al., Technologies under Consideration for ISOBMFF, International Organisation for Standardisation, Coding of Motion Pictures and Audio, ISO/IEC JTC1/SC29/WG11 MPEG2018/N18240, Jan. 2019, Marrakech, MA, 62 pages.
(Continued)

*Primary Examiner* — Anthony Bantamoi
(74) *Attorney, Agent, or Firm* — Canon U.S.A., Inc. IP Division

(57) ABSTRACT

The present invention concerns method of generating a file of image data comprising samples, wherein the method comprises: generating a derived track comprising a derived track configuration data structure and derived samples, the derived track comprising a sequence of derivation operations to be applied on input data, each derivation operation comprising a list of references to input tracks and/or input items; wherein the derived track comprises an information indicating that one input track of a derivation operation is the output of the previous derivation operation in the sequence; and, generating the file comprising the derived track, and the input tracks and/or input items.

16 Claims, 6 Drawing Sheets

(58) Field of Classification Search
CPC ........... H04N 21/2353; H04N 21/2358; H04N 21/4358; H04N 21/8456
See application file for complete search history.

(56) References Cited

OTHER PUBLICATIONS

Vinod Kumar Malamal Vadakital, et al., Looped Presentation of Media in ISOBMFF Tracks, International Organisation for Standardisation, Coding of Motion Pictures and Audio, ISO/IEC JTC1/SC29/WG11 MPEG2013/M30315, Jul. 2013, Vienna, AT, 3 pages.

Xin Wang, et al., Deriving Composite Tracks in ISOBMFF Using Track Grouping Mechanisms, International Organisation for Standardisation, Coding of Motion Pictures and Audio, ISO/IEC JTC1/SC29/WG11 MPEG 2016/M40384, Apr. 2017, Hobart, AU, 12 pages.

* cited by examiner

METHOD AND APPARATUS FOR ENCAPSULATING DERIVED TRACKS

CROSS REFERENCE TO RELATED APPLICATION

This application is the National Phase application of PCT Application No. PCT/EP2020/055632, filed on Mar. 4, 2020, and titled "METHOD AND APPARATUS FOR ENCAPSULATING DERIVED TRACKS". This application claims the benefit under 35 U.S.C. § 119(a)-(d) of United Kingdom Patent Application No. 1903683.9, filed on Mar. 18, 2019 and entitled "METHOD AND APPARATUS FOR ENCAPSULATING DERIVED TRACKS". The above cited patent applications are incorporated herein by reference in their entirety.

FIELD OF THE INVENTION

The present disclosure concerns a method and a device for encapsulating derived tracks.

BACKGROUND OF INVENTION

The International Standard Organization Base Media File Format (ISO BMFF, ISO/IEC 14496-12) is a well-known flexible and extensible format that describes encoded timed and non-timed media data bit-streams either for local storage or transmission via a network or via another bit-stream delivery mechanism. An example of extensions is ISO/IEC 14496-15 that describes encapsulation tools for various NAL (Network Abstraction Layer) unit based video encoding formats. Examples of such encoding formats are AVC (Advanced Video Coding), SVC (Scalable Video Coding), HEVC (High Efficiency Video Coding), and L-HEVC (Layered HEVC). Another example of file format extensions are ISO/IEC 23008-12 (HEIF or High Efficiency Image File Format) and the related ISO/IEC 23000-22 (MIAF or Multi-Image Application Format) that describe encapsulation tools and related set of constraints for still images or sequence of still images such as HEVC Still Image. This file format is object-oriented. It is composed of building blocks called boxes and full boxes. Boxes are data structures comprising and characterized by a four-character code noted FourCC or 4CC, and comprising a length attribute. Full boxes are data structures similar to boxes comprising in addition a version and flags value attributes. Those boxes or full boxes are hierarchically or sequentially organized in the ISOBMFF file and define parameters describing the encoded timed or non-timed media data bit-stream, its structure and timing, if any. All data in a file (media data and metadata describing the media data) is contained in boxes. There is no other data within the file.

In the file format, each timed media data bit-stream is described by one or more tracks represented by one or more track boxes (with the four-character code 'trak') encapsulated into a MovieBox ('moov'). Each track (uniquely identified by a track identifier (track_ID)) represents a timed sequence of related samples. Each sample represents all the media data associated with a single time (e.g., frame of a video, an audio sample or a timed metadata). Samples are implicitly numbered in decoding order sequence. The actual sample media data are stored in boxes called MediaDataBox (with the four-character code 'mdat') at file level. File-level boxes are boxes that are not contained in any other boxes.

Each non-timed media data bit-stream is described by one or more static items represented by one or more full box ItemInfoEntry (with the four-character code 'infe') encapsulated into an ItemInfoBox ('iinf') in a MetaBox ('meta'). Each item is uniquely identified by an item identifier (item_ID). The actual item data are stored either in an ItemDataBox ('idat') in the MetaBox ('meta') or in a MediaDataBox ('mdat') at file level.

An ISOBMFF file may contain multiple encoded timed media data bit-streams forming multiple tracks and/or multiple static items. ISOBMFF and its extensions comprise several grouping mechanisms to group together tracks, static items, or samples. A group typically shares common semantic and/or characteristics.

For instance, ISOBMFF comprises an entity group mechanism, a track group mechanism, and a sample group mechanism. The entity grouping mechanism can be used to indicate that tracks and/or static items are grouped according to an indicated grouping type or semantic. The track grouping mechanism can be used to indicate that tracks are grouped according to an indicated grouping type or semantic. The sample grouping mechanism can be used to indicate that certain properties associated with an indicated grouping type or semantic apply to an indicated group of samples within a track.

ISOBMFF is defining a specific type of track, called derived track that can be used to define a track for which output samples are derived from items, or samples of one or several input tracks. A derived track does not describe any actual media data. Instead, derived track's samples comprises an ordered list of derivation operations. The actual media data corresponding to the output of a derived track's sample is obtained by applying the ordered list of derivation operations from the derived track's sample to an ordered list of input items, or samples of one or more input tracks. All derivation operations used by the samples in the derived track are listed once in the sample entries of the derived track (of type 'dtrk'), and optionally default inputs and parameter values can also be supplied there. The ISOBMFF standard provides predefined derivation operations, each associated with a predefined four-character code. The ISOBMFF standard also allows defining proprietary (or user-specific) derivation operations with the specific 4CC "uuid" associated with a 16-byte Universally Unique IDentifier (UUID) conformant with IETF RFC 4122 that identifies the proprietary derivation operations. Derivation operations can be marked as essential or not essential either in samples or sample entries. A derivation operation in a sample entry shall be marked as essential if a derivation operation with a same derivation type (4CC) is defined as essential in at least one sample associated with this sample entry. A decoder decoding a derived track comprising an unknown derivation operation marked as essential triggers an error and stop the decoding of the derived track. An unknown derivation operation that is not marked as essential is simply ignored at decoding, it does not stop the decoding of the derived track.

Unfortunately, current standard does not allow managing sequences of derivation operations, in particular for multi-input derivations, or managing post-decoder operations with all the desired flexibility. Moreover, the standard does not provide any mechanism to allow managing input tracks or items with disparate properties.

SUMMARY OF THE INVENTION

The present invention has been devised to address one or more of the foregoing concerns. It concerns mechanisms to specify that an input of a derivation is the output of a previous derivation operation, to specify the use or not of a post-decoder operation of an input of a derivation operation, to specify the size of the output of derived samples, or the timeline used for the inputs of a derived track. The different embodiments of the invention described in this document, while being described in the context of ISOBMFF standard may be applied similarly in any derived standards.

According to another aspect of the invention, it is provided a method of generating a file of image data comprising samples, wherein the method comprises:

generating a derived track comprising a derived track configuration data structure and derived samples, the derived track comprising a sequence of derivation operations to be applied on input data, each derivation operation comprising a list of references to input tracks and/or input items;

wherein the derived track comprises an information indicating that one input track of a derivation operation is the output of the previous derivation operation in the sequence; and, generating the file comprising the derived track, and the input tracks and/or input items.

In an embodiment:

the list of references to input tracks and/or input items in each derivation operation is an array of track reference indexes, one track reference index corresponding to the index of an input track and/or input item of the derivation operation;

each derivation operation comprises a bit mask, each bit of the bit mask corresponding to the respective track reference index of the array of track reference indexes; and a bit of the bit mask with a value '1' corresponding to a track reference index having a value '0' is the information indicating that the corresponding input of the derivation operation is the output of the previous derivation operation in the sequence.

In an embodiment:

a bit of the bit mask with a value '1' corresponding to a track reference index having its most significant bit set to '1' is an information indicating that the corresponding input of the derivation operation is the output of the derivation operation in the sequence having an index corresponding to the remaining bits of the track reference index.

In an embodiment:

the derived track configuration data structure further comprises an information on a maximal number of intermediate output of derivation operations that needs to be stored in the sequence of derivation operations.

In an embodiment:

each derivation operation comprises a bit mask, each bit of the bit mask corresponding to the respective input track of the derivation operation; and a bit of the bit mask with a value '0' present in both the derivation operation in a sample and a corresponding derivation operation present in the derived track configuration data structure is the information indicating that the corresponding input of the derivation operation is the output of the previous derivation operation in the sequence.

According to another aspect of the invention, it is provided a method of generating a file of image data comprising samples, wherein the method comprises:

generating a derived track comprising a derived track configuration data structure and derived samples, the derived track comprising a sequence of derivation operations to be applied on input data, each derivation operation comprising a list of references to input tracks and/or input items;

wherein the derived track comprises a post-decoder operation information indicating whether a post-decoder operation comprised in an input data must be ignored; and, generating the file comprising the derived track, and the input tracks and/or the input items.

In an embodiment:

the post-decoder information is located within the derived track configuration data structure.

In an embodiment:

the post-decoder information is located within a sample.

In an embodiment:

the post-decoder information is located within a derivation operation.

According to another aspect of the invention, it is provided a method of generating a file of image data comprising samples, wherein the method comprises:

generating a derived track comprising a derived track configuration data structure and derived samples, the derived track comprising a sequence of derivation operations to be applied on input data, each derivation operation comprising a list of references to input tracks and/or input items;

wherein the derived track comprises an edit-list information indicating whether edit lists comprised in input tracks to define presentation timeline must be ignored; and, generating the file comprising the derived track, and the input tracks and/or input items.

In an embodiment:

the edit-list information is located within the derived track configuration data structure.

In an embodiment:

the edit-list information is located within a sample.

In an embodiment:

the edit-list information is located within a derivation operation.

According to another aspect of the invention, it is provided a method of generating a file of image data comprising samples, wherein the method comprises:

generating a derived track comprising a derived track configuration data structure and derived samples, the derived track comprising a sequence of derivation operations to be applied on input data, each derivation operation comprising a list of references to input tracks and/or input items;

wherein the derived track configuration data structure comprises an indication related to the input track and/or input item to consider for determining the size of the derived sample, and, generating the file comprising the derived track, and the input tracks and/or input items.

In an embodiment, the method further comprises:

determining a difference between the size of the input track and/or input item to consider and the size of the derived sample; and, filling an area corresponding to the difference with a default color.

In an embodiment, the size indication indicates that samples of the input tracks must be resized based on this size indication.

According to another aspect of the invention, it is provided a file of image data comprising samples as generated using the method of the invention.

According to another aspect of the invention, it is provided a device for generating a file of image data comprising samples, wherein the device comprises circuitry configured for:
 generating a derived track comprising a derived track configuration data structure and derived samples, the derived track comprising a sequence of derivation operations to be applied on input data, each derivation operation comprising a list of references to input tracks and/or input items;
 wherein the derived track comprises an information indicating that one input track of a derivation operation is the output of the previous derivation operation in the sequence; and,
 generating the file comprising the derived track, and the input tracks and/or input items.

According to another aspect of the invention, it is provided a device for generating a file of image data comprising samples, wherein the device comprises circuitry configured for:
 generating a derived track comprising a derived track configuration data structure and derived samples, the derived track comprising a sequence of derivation operations to be applied on input data, each derivation operation comprising a list of references to input tracks and/or input items;
 wherein the derived track comprises a post-decoder operation information indicating that a post-decoder operation comprised in an input data must be ignored; and,
 generating the file comprising the derived track, and the input tracks and/or the input items.

According to another aspect of the invention, it is provided a device for generating a file of image data comprising samples, wherein the device comprises circuitry configured for:
 generating a derived track comprising a derived track configuration data structure and derived samples, the derived track comprising a sequence of derivation operations to be applied on input data, each derivation operation comprising a list of references to input tracks and/or input items;
 wherein the derived track comprises an edit-list information indicating that edit lists comprised in input tracks to define presentation timeline must be ignored; and,
 generating the file comprising the derived track, and the input tracks and/or input items.

According to another aspect of the invention, it is provided a device for generating a file of image data comprising samples, wherein the device comprises circuitry configured for:
 generating a derived track comprising a derived track configuration data structure and derived samples, the derived track comprising a sequence of derivation operations to be applied on input data, each derivation operation comprising a list of references to input tracks and/or input items;
 wherein the derived track configuration data structure comprises an indication related to the input track and/or input item to consider for determining the size of the derived sample, and,
 generating the file comprising the derived track, and the input tracks and/or input items.

According to another aspect of the invention, it is provided a computer program product for a programmable apparatus, the computer program product comprising a sequence of instructions for implementing a method according to the invention, when loaded into and executed by the programmable apparatus.

According to another aspect of the invention, it is provided a computer-readable storage medium storing instructions of a computer program for implementing a method according to the invention.

According to another aspect of the invention, it is provided a computer program which upon execution causes the method of the invention to be performed.

At least parts of the methods according to the invention may be computer implemented. Accordingly, the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible, non-transitory carrier medium may comprise a storage medium such as a floppy disk, a CDROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
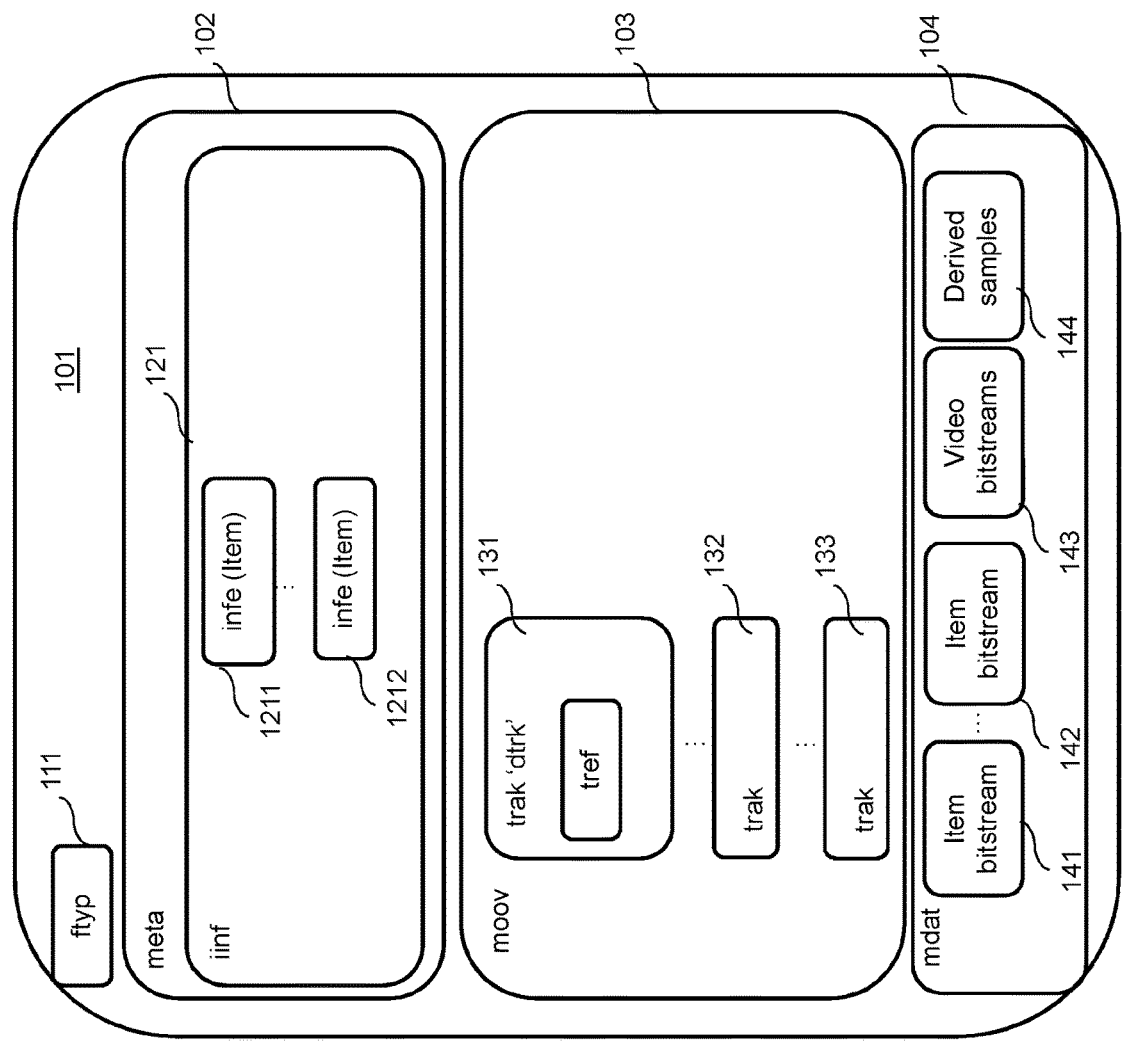
FIG. 1 illustrates an example of an ISOBMFF file that contains derived track.

FIG. 1 illustrates an example of an ISOBMFF file 101 that contains a derived track with some input tracks and items. This file contains a first 'ftyp' box (FileTypeBox) 111 that contains an identifier of the type of file (typically a set of four character codes).

This file may contain a 'meta' box (MetaBox) 102 that is used to contain general untimed metadata. This 'meta' box 102 may contain an 'iinf' box (ItemInfoBox) 121 that describes several items (e.g., still images or part of still images conformant with HEIF or MIAF standard). Each item is described by a data structure ItemInfoEntry 'infe' also denoted item 1211 and 1212. Each item has a unique 32-bit identifier item_ID. The media data corresponding to these items is stored in the container for media data, the 'mdat' box 104.

For describing timed media data and derived tracks, the file 101 contains a 'moov' (MovieBox) 103 that contains several TrackBox(es) (with four character code 'trak') each describing a track 131, 132 and 133. Each track has a unique 32-bit identifier track_ID. Each TrackBox contains a sample entry with a 4CC sample entry type describing the format of samples. Sample entry is a data structure contained in a SampleDescriptionBox ('stsd') in the hierarchy of boxes contained in the TrackBox ('trak') (not represented). Track 131 is a derived track identified by its containing sample entry of type 'dtrk'. The derived track includes a TrackReferenceBox ('tref') with a TrackReferenceTypeBox with reference_type equal to 'dtrk' listing both the track_ID values of all input tracks used by derived samples in the derived track and the item_ID values of all items used by derived samples of the derived track. An ID value in the 'dtrk' box is resolved to a track_ID whenever the file contains a track with such ID, and is resolved to an item_ID otherwise. References to input tracks/items are indexes on track reference box, each entry of the track reference box identified by the index is the identifier (track_ID) of an input track, or an identifier (item_ID) of an input item. By construction, track_ID and item_ID do not overlap.

Tracks 132 and 133 describes other types of track, e.g., representing sequence of image samples, an image sample being a set of pixels captured at the same time, for example a frame of a video sequence. The data corresponding to samples (including samples from derived track) is stored in the container for media data, the 'mdat' box 104. Alternatively, the data corresponding to samples of an input track is stored in an external file (possibly identified using a DataReferenceBox) different from the file 101.

The 'mdat' container 104 stores the untimed encoded images corresponding to items as represented by the data portions 141 and 142, the timed encoded images (samples) represented by the data portion 143 and derived track's derivation operations (derived sample) represented by the data portion 144.

Figure 2:
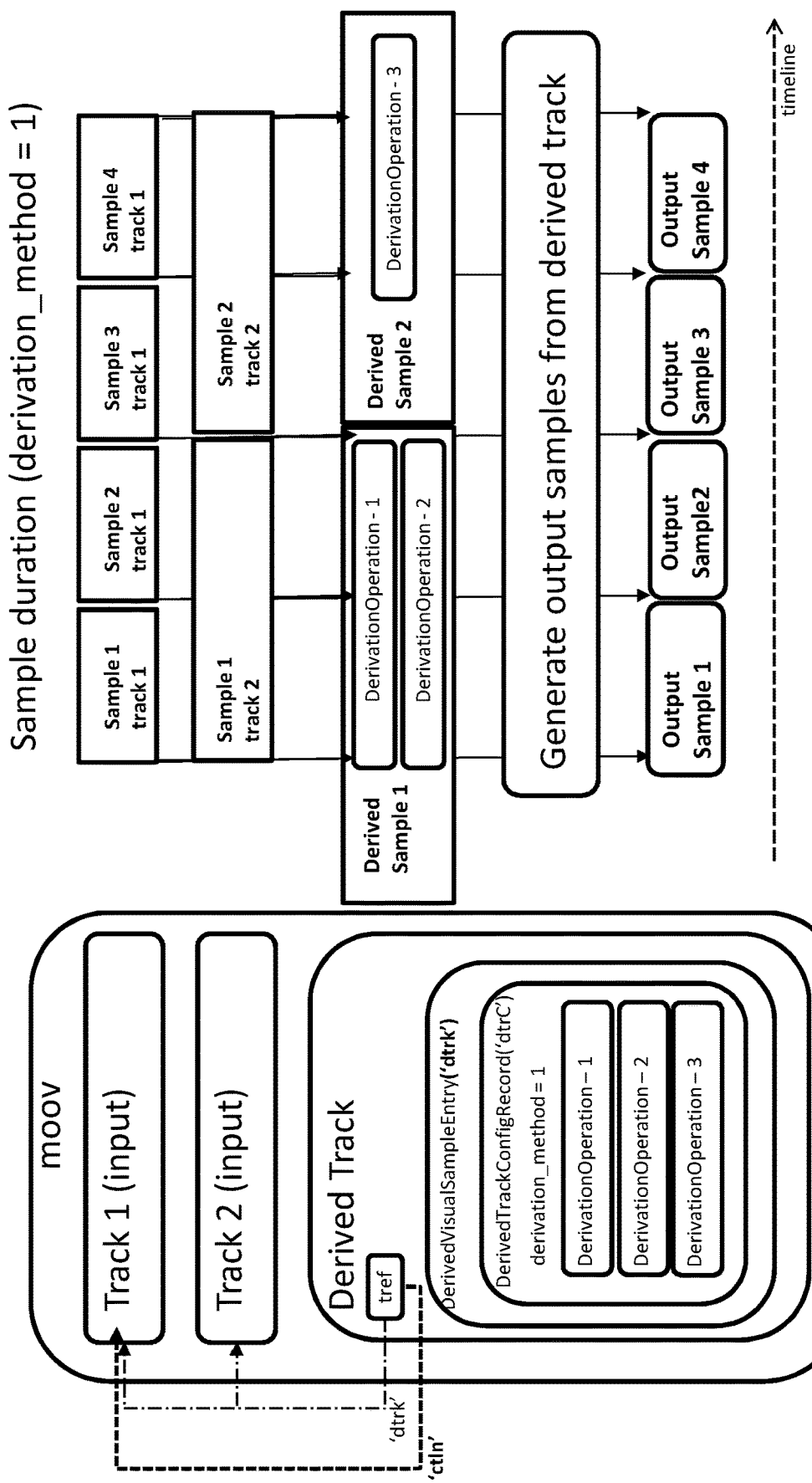
FIG. 2 illustrates an example of generation of output samples from a derived track.

FIG. 2 illustrates an example of generation of output samples from a derived track according to some embodiments. A derived sample contains an ordered list of the derivation operations to be performed on an ordered list of input items or samples. The derived sample durations document the time the ordered list of derivation operations is active.

In this example, the derived track TrackBox contains a TrackReferenceBox ('tref') with a TrackReferenceTypeBox with reference_type equal to 'dtrk' listing all tracks or items possibly used by derivation operations. In this example, the derived track may use samples from track 1 and track 2 as inputs to derivation operations.

In addition, the derived track TrackBox contains a sample entry of type 'dtrk' (also denoted DerivedVisualSampleEntry) that contains a derived track configuration data structure DerivedTrackConfigRecord box ('dtrC') that provides configuration parameters of the derived track and the list of derivation operations documenting all the possible derivation operations used in the samples of the track. Derivation operations listed in the sample entry may provide default parameters and default inputs to be used by the derivation operations actually used in the derived samples. The list of derivation operations can also be used by the player to check if it understands all derivation operations used in the derived track to determine if it can process or not this derived track.

An example of syntax of DerivedVisualSampleEntry is as follows:
Box Type: DerivedTrackConfigRecord
Container: DerivedVisualSampleEntry
Mandatory: Yes in a track containing a DerivedVisualSampleEntry
Quantity: One

```
aligned(8) class DerivedTrackConfigRecord( ) extends Box ('dtrC') {
    unsigned int(2) default_first_derivation_input;
    unsigned int(2) derivation_method;
    unsigned int(4) reserved;   //
    VisualDerivation  derivations[ ];  // to fill box
}
aligned(8) class DerivedVisualSampleEntry extends VisualSampleEntry ('dtrk'){
    DerivedTrackConfigRecord derived_config;  // mandatory
}
```

Where default_first_derivation_input indicates the default input for the first derivation. Value 0 corresponds to a full black picture, value 1 corresponds to a full white picture and value 2 corresponds to a mid grey picture. Value 3 is reserved.

derivation_method indicates the derivation method to be used for determining the timing and number of output samples of the derived track relatively to the composition timeline (i.e., before the application of edit lists of the derived track):

When equal 0, the timing and number of output samples correspond to the temporal combination of samples of any of all input tracks or of the derived track itself (default behaviour). (That is, there is conceptually a new output sample at least whenever any input changes).

When equal 1, the timing and number of output samples correspond to the temporal combination of samples of the input track provided by track reference of type 'ctln'.

When equal 2, the timing and number of output samples are aligned with the samples of the derived track.

When equal 3, the timing and number of output samples are not mandated and are derived by the client (e.g., it matches the display refresh rate, or the derivation represents a time-based operation such as a cross-fade).

The derived track may also have edit lists whatever the derivation method is. When applied after the derivation method, they provide the timing and number of output samples of the derived track on the presentation timeline. If the derived track does not have an edit list then its presentation timeline is equal to its composition timeline.

When derivation_method is equal to 1, the derived track shall include a TrackReferenceTypeBox with reference_type equal to 'ctln' indicating one input track providing the composition timeline for this derived track.

derivations is an array of derivation operations used by all or some of the samples of the derived track.

It is to be noted that each derivation box used in the derived track will appear first in the sample entry box as a declaration of the derivation operation and will be replicated in the samples using this derivation operation in a derivation sequence used to derive this sample.

This syntax mixes in a same box some parameter fields and boxes. It might be desirable that only leaves of the hierarchy of boxes contain parameter fields. Some alternative syntaxes are proposed which do not mix in a same box some parameter fields and boxes.

In an alternative syntax, to avoid mixing of fields and boxes in a box, the DerivedTrackConfigRecord('dtrC') box may be defined as a full box and parameters may be declared in the flags of the full box as follows:

```
aligned(8) class DerivedTrackConfigRecord( ) extends FullBox ('dtrC',
version = 0, flags) {
    VisualDerivation derivations[ ]; // to fill box
}
```

Where following flags are defined:
0x00000x derived track default; indicates the default input and processing:
    unsigned int(2) default_first_derivation_input;
    unsigned int(2) derivation_method;

In another alternative syntax, derived track's parameters are declared in a new box VisualDerivationDefault('dtrD') as follows:

```
aligned(8) class VisualDerivationDefault( ) extends FullBox ('dtrD',
version = 0, flags = 0) {
   unsigned int(2) default_first_derivation_input;
   unsigned int(2) derivation_method;
   unsigned int(4) reserved;
}
aligned(8) class DerivedTrackConfigRecord( ) extends Box ('dtrC') {
   VisualDerivationDefault   derived_default_config;
   VisualDerivation   derivations[ ]; // to fill box
}
```

In another alternative syntax, rather than including an array of complete derivation operation data structures with possibly default parameters and/or inputs values, the derived track's configuration data structure (e.g. DerivedTrackConfigRecord box ('dtrC')) may only contain the list of 4CC of derived operations used by the derived track (including the UUID for proprietary derived operations). An example of syntax of the DerivedVisualSampleEntry is defined as follows:
    Box Type: DerivedTrackConfigRecord
    Container: DerivedTrackSampleEntry
    Mandatory: Yes in a track containing a DerivedTrackSampleEntry
    Quantity: One

```
aligned(8) class DerivedTrackConfigRecord( ) extends Box
('dtrC') {
   unsigned int(2) default_first_derivation_input;
   unsigned int(2) derivation_method;
   unsigned int(4) reserved;
   do {
     unsigned int(1) essential;
     unsigned int(1) is_uuid_flag;
     unsigned int(6) reserved;
     if (is_uuid_flag == 1)
        unsigned int(8)[16] operation_uuid;
     else
        unsigned int(32) operation_4cc;
   }while (!EndOfBox( ))
}
aligned(8) class DerivedVisualSampleEntry extends VisualSampleEntry
('dtrk'){
   DerivedTrackConfigRecord derived_config;   // mandatory
}
```

Where
default_first_derivation_input and derivation_method are defined as above.

essential when set to 1 indicates that the transform property is essential, otherwise it is non-essential.

is_uuid_flag equal to 1 indicates that the derivation operation code that follows is a 16-byte UUID (universal unique identifiers). Otherwise the derivation operation code that follows is a 4-byte 4CC.

operation_uuid is a 16-byte UUID code that identifies the extended type of a vendor-specific 'uuid' derivation operation.

operation_4cc is a four-character code that identifies a normative derivation operation.

All essential derivation operations shall be listed first.

It is to be noted that this embodiment allows a more concise declaration of derivation operations used by a derived track.

In this example, derivation_method is set to 1 and the TrackReferenceBox ('tref') of the derived track contains a TrackReferenceTypeBox with reference_type equal to 'ctln' that designates the track 1 to determine the timing and number of output samples of the derived track. Therefore, during the duration of the derived sample 1, each time there is a new sample in track 1, DerivationOperation 1 and DerivationOperation 2 are computed on their inputs to obtain an output sample (output samples 1 and 2). Similarly, during the duration of the derived sample 2, each time there is a new sample in track 1, DerivationOperation 3 is computed on its inputs to obtain an output sample (output samples 3 and 4).

A derivation operation in either a sample entry or in a sample is represented by a box containing both inputs and parameters of the operation or transformation to be performed on inputs.

Figure 3:
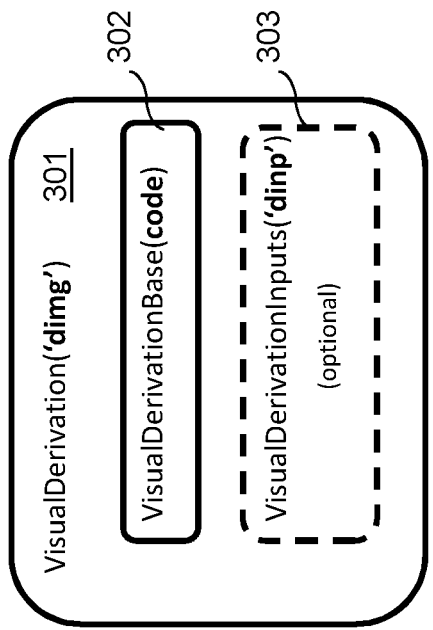
FIG. 3 illustrates an example of derivation operation box.

According to some embodiments, as illustrated in FIG. 3, the derivation operation box is represented by a container box VisualDerivation of type 'dimg' 301 that always carries a transformation box 302 inherited from VisualDerivationBase identified by an operation-specific four-character definition code and may carry a derivation-inputs box of type 'dinp' 303.

For both inputs and parameters, not all inputs and parameters are necessarily present in the definition of the derivation operation box in each sample or sample entry. For both inputs and parameters, there is a bit mask associated with derivation operation parameters and a bit mask associated with inputs defining whether the parameter value or input is supplied in the box.

Each parameter takes the value defined in that sample, if any, or else the value defined in the sample entry, if any, or else the default value for that parameter defined in the derivation specification.

Each input takes the track reference box index defined in that sample, if any, or else the track reference box index defined in the sample entry, if any, or else the output of a previous derivation in the same sample.

Examples of syntax is as follows:

```
aligned(8) class VisualDerivationBase extends FullBox (code, version =
0, flags, optional unsigned int(8)[16] uuid_code){
     if (code=='uuid') {
        unsigned int(8)[16] usertype = uuid_code;
     }
     unsigned int(16) parameter_count;
     unsigned int(floor((parameter_count+7)/8))*8)
     parameter_defined_flags;
     // if the Nth bit is the highest bit set in the flags, then the
     // first through Nth parameters must be present, even if some are
     // not defined by the values here
```

```
}
aligned(8) class VisualDerivationInputs extends FullBox ('dinp',
version = 0, flags){
    unsigned int(16) input_count;
    unsigned int(floor((input_count+7)/8))*8) input_present_flags;
    unsigned int(16) track_reference_index[ ];
    // if the Nth bit is the highest bit set in the flags, then there must
    // be N entries in the reference array
}
aligned(8) class VisualDerivation extends Box ('dimg'){
    VisualDerivationBase( )  derivation;
        // actually an instance of a derived class
    VisualDerivationInputs  inputs;  // optional, as noted below
}
```

Where, if the transformation box code is 'uuid', then an additional Universally Unique IDentifier (UUID) identifies a vendor-specific (proprietary) derivation operation.

parameter_count provides the 1-based index of the highest parameter (in parameter order) present in the transformation box. If the parameter_count equals the value 0, then there is no parameter present in the box and the parameter_count and parameter_defined_flags can be omitted (box size equals to empty box size would indicates there is no attribute in the box). Alternatively, parameter_count provides the maximum number of parameters present in the transformation box.

parameter_defined_flags is a bit mask that indicates which parameter is present in the box. If the Nth bit is the highest bit set in the flags, then the first through Nth parameters must be present, even if some are not defined by the values here. Alternatively, if there is M bits set to 1 between the least significant bit and the Nth bit included, then there must be M parameters present in the box. This parameter is omitted if parameter_count equals the value 0.

input_count provides the 1-based index of the highest input (in input order) present in the VisualDerivationInputs box. If the input_count equals the value 0, then the VisualDerivationInputs box can be omitted. Alternatively, input_count provides the maximum number of inputs defined by the derivation operation.

input_present_flags is a bit mask that indicates which input is present in the box. If no input is defined in that VisualDerivationInputs box (input_present_flags=0), this box may be omitted. If the Nth bit is the highest bit set in the flags, then there must be N entries in the reference array track_reference_index[ ]. Alternatively, if there is M bits set to 1 between the least significant bit and the Nth bit included, then there must be M entries in the reference array track_reference_index[ ].

track_reference_index is an array (of size input_count or of size corresponding to the number of input_present_flags set to 1) that provides the 1-based index to the TrackReferenceTypeBox of type 'dtrk', or the value 0 to indicate the output of the preceding derivation operation.

Figure 4:
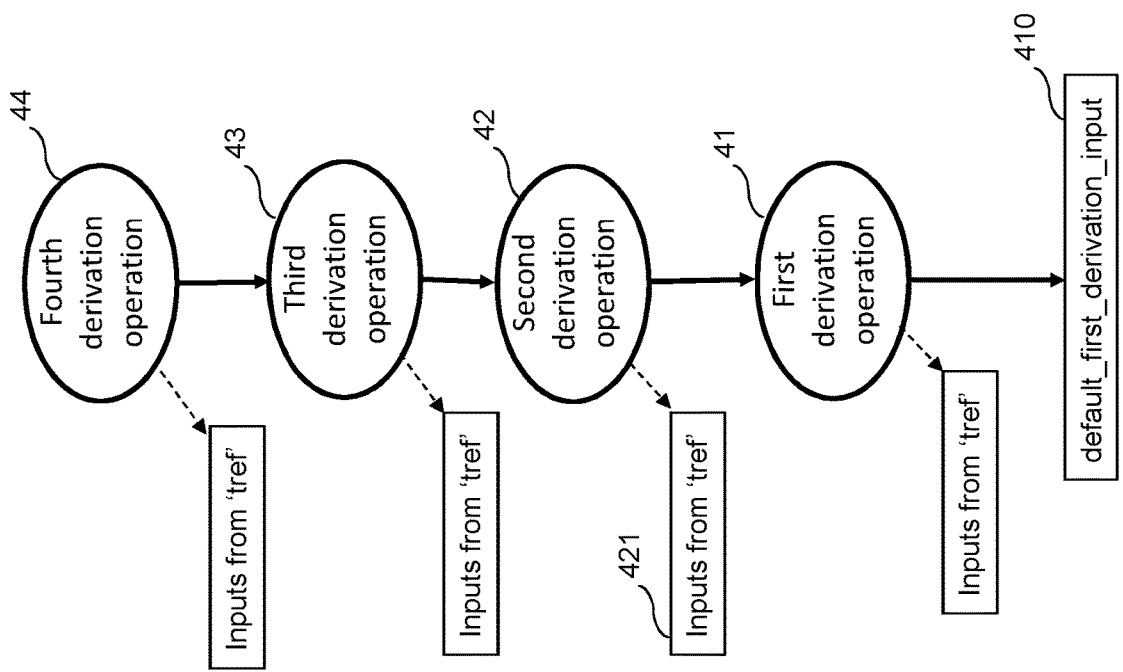
FIG. 4 illustrates an example of derivation sequence.

When a sequence of derivation operation is used in a derived sample, each derivation operation is applied successively. However, there is a need to properly specify which of the input of a derivation operation corresponds to the output of the previous derivation operation. In an embodiment, each derivation operation uses the output of the previous one as one of its inputs. According to that embodiment illustrated in FIG. 4, when more than one derivation operation is listed in a derived sample, the derivation operation that is not first in the list shall include at least the output result (e.g., the output image or audio sample) of the previous operation as one of its inputs. The previous operation is signalled according to one of the two methods below:

Explicitly by having at least one bit N in the input_present_flags bit mask indicating either in sample entry or in sample that an input is present with the associated $N^{th}$ entry in track_reference_index array equals to the value 0.

Implicitly by having at least one bit N in the input_present_flags bit mask of size input_count that is not present in both sample entry and sample indicating that the $N^{th}$ input identified by this bit N is the output of the previous derivation operation by default.

The implicit method means that, to indicate that the second input, for example, of the derivation operation corresponds to the output of the previous derivation operation, the second bit of the input_present_flags bit mask is set to '0' in both the derivation box present in the sample entry and in the derivation box present in the actual sample.

For instance, the second derivation operation 42 shall take the output of the first operation 41 (with possibly new inputs 421). The same rule applies for third and fourth derivation operations 43 and 44.

If an input is not defined in both sample entry and sample for a first derivation operation 41, a default input is determined according to the value of the default_first_derivation_input parameter 410.

In some embodiments, it may be desirable to be able to specify that an input of a derivation operation is the output of one among the previous derivation operations in the sequence. In those embodiments, an input is not limited to the output of the previous derivation operation.

Figure 5:
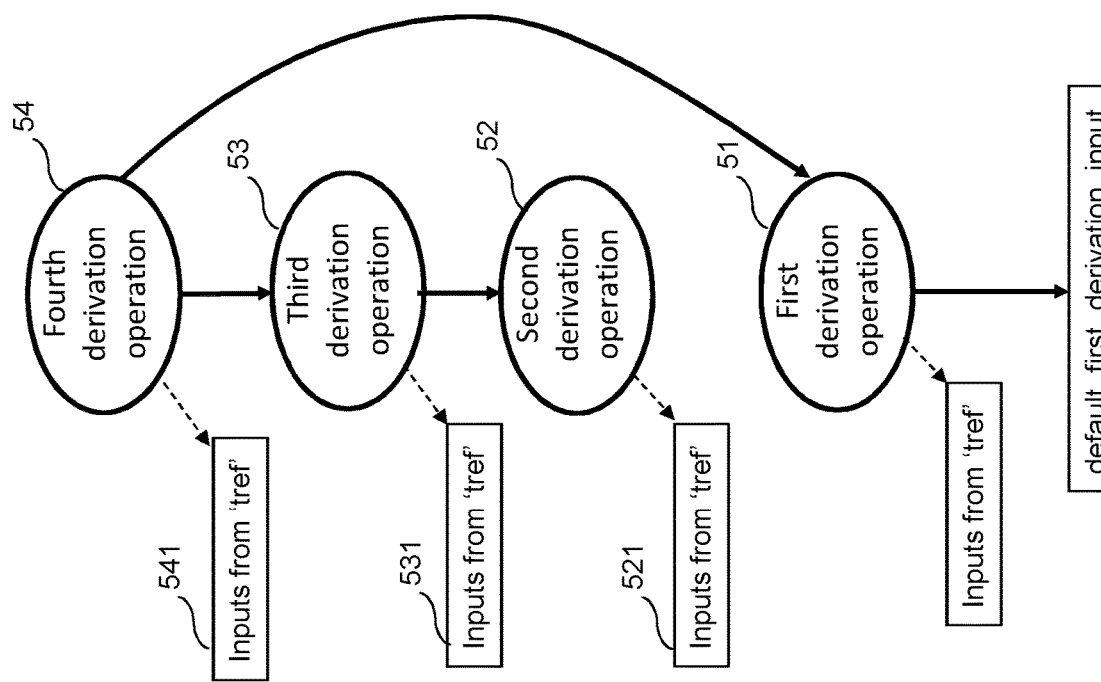
FIG. 5 illustrates another example of derivation sequence.

According to an alternative embodiment illustrated in FIG. 5, when more than one derivation operation is listed in a derived sample, the derivation operation that is not first in the list may include at least the output result (e.g., the output image or audio sample) of the previous derivation operation or at least the output result of any one of the previous derivation operations or only new inputs. For instance, in FIG. 5, the second derivation operation 52 only takes new inputs 521, the third derivation operation 53 takes the output of the previous second operation 52 (with possibly new inputs 531) and the fourth derivation operation 54 takes the output of the previous third operation 53 and the output of the first operation 51 (with possibly new inputs 541).

According to this embodiment, the different alternative inputs are signalled using the Most Significant Bit (MSB) of track_reference_index entry values to differentiate between inputs taken from the Track Reference Box from inputs taken from the output of previous operations:

If the $N^{th}$ bit in the input_present_flags bit mask is set, the $N^{th}$ input is identified as follows:

If the associated $N^{th}$ entry value in track_reference_index array is equal to value 0, then the $N^{th}$ input is the output of the preceding derivation operation.

Else if the associated $N^{th}$ entry value in track_reference_index array doesn't have the MSB set, then the $N^{th}$ input is the $N^{th}$ entry (as 1-based index) in the TrackReferenceTypeBox of type 'dtrk'.

Else if the associated $N^{th}$ entry value in track_reference_index array does have the MSB set, then the remaining bits indicate the 1-based index to the ordered list of derivation operations.

In alternatives, the 1-based index may be set relatively to the derivation operation or relatively to the order of derivation operations.

When a derived output sample is obtained by applying a list of multiple derivation operations, it may be necessary to allocate multiple intermediate buffers to store the output result of intermediate derivation operations. When a derivation operation can only depend on new inputs or output of the directly preceding operation, the player can use only two buffers, one for the output of the preceding operation and one for the output of the current derivation operation. In case, derivation operations may depend on more than one output derivation operations, it may be useful to signal in the sample entry of the derived track the maximum number of intermediate output derivation operations used by any derivation operations in the derived track to help the player determining if it can allocate enough memory to process the derived track.

In a variant, an example of syntax of DerivedTrackConfigRecord( ) is modified as follows:

```
aligned(8) class DerivedTrackConfigRecord( ) extends Box ('dtrC') {
    unsigned int(8) max_intermediate_output;
    unsigned int(2) default_first_derivation_input;
    unsigned int(2) derivation_method;
    unsigned int(4) reserved;
    VisualDerivation  derivations[ ]; // to fill box
}
```

Where max_intermediate_output indicates the maximum number of output derivation operations used as inputs in any samples of the derived track.

The width and height in the derived track's sample entry document the pixel counts that the derived sample processing will deliver; this enables determining the size of buffers to allocate. The maximum number of buffers to allocate is max_intermediate_output+1 (number of preceding outputs used as inputs+current output).

All tracks, derived or not, may be provided with post-decoder operations. These post-decoder operations are operations that are meant to be applied after the decoding of samples. When a track is used as an input of a derivation operation, it might be desirable to be able to specify if samples of the input track that have to be used as input of the derivation operation must have the post-decoder operation applied. For example, if an input track has a post-decoder operation consisting in a 'crop' operation, and if this track is used as an input of a 'rotation' derivation operation, it is desirable to be able to specify if the rotation applies to the non-cropped input samples or to the 'cropped' input samples.

Similarly, the tracks may also be provided with edit lists to define a presentation timeline based on the composition timeline associated with the track. It might be desirable to be able to specify for a given input of a derivation operation whether an edit list of the input track should be taken into account to determine the samples to be used in the derivation.

In another aspect of embodiments, tracks consist of a sequence of samples in decoding order (i.e., in the order to be consumed by a decoder). In some coding systems (notably video) samples are coded in a different order from their presentation order. In this case, each sample is assigned a composition time (described by some boxes of ISOBMFF standard, e.g., CompositionOffsetBox). This forms the composition timeline, and reorders the samples into composition order. In addition, ISOBMFF defines presentation timelines that consist for each track in concatenating sections of the composition timeline by means of explicit or implicit edit lists.

Edit lists for a track are defined in an EditListBox('elst') in the TrackBox('trak'). This box contains an explicit timeline map for the track. Each entry in this box defines part of the track timeline: by mapping part of the composition timeline, or by indicating 'empty' time (portions of the presentation timeline that map to no media, an 'empty' edit), or by defining a 'dwell', where a single time-point in the media is held for a period.

The presentation timelines of all the tracks are aligned at their zero point. This forms the presentation timeline for the presentation of all tracks in the file as a whole.

Derived visual tracks are similar to any other tracks in ISOBMFF except that they do not use composition-time reordering. They operate on the presentation timeline (i.e., after the application of edit lists) of their input tracks.

In some cases, when input tracks include edit lists, it may be desirable for the derived operations to operate on the composition timeline to some or all of input tracks to derive the output sample and then to apply the edit lists defined in the derived track to determine the effective presentation timing of the output sample.

Input tracks may also include some post-decoder operations defined in their sample entries. For instance, sample entry of an input track may include a CleanApertureBox ('clap') defining an image crop or a transformation matrix describing shearing or arbitrary rotation, for example.

Similarly, input items may be associated with transformative item properties such as a CleanApertureBox('clap') defining an image crop, an ImageRotation('irot') defining rotation in units of 90 degrees, an ImageMirror('imir') defining a mirroring of the image item about either a vertical or horizontal axis.

When input tracks or input items include such post-decoder operations, it may be desirable to operate in derivation operations on input samples or input items before applying the post-decoder operations associated with those input tracks or items.

In some embodiments, a new signalling is added in the configuration parameters of the derived track either in the DerivedTrackConfigRecord('dtrC') or in the VisualDerivationDefault('dtrD') or as box flags depending on embodiments and applies globally to all inputs.

Below is an example of syntax for VisualDerivationDefault('dtrD'):

```
aligned(8) class VisualDerivationDefault( ) extends FullBox ('dtrD',
version = 0, flags = 0) {
    unsigned int(8) max_intermediate_output;
    unsigned int(2) default_first_derivation_input;
    unsigned int(2) derivation_method;
    unsigned int(1) input_edit-list_disabled;
    unsigned int(1) input_post_decoder_disabled;
    unsigned int(2) reserved;
}
```

Where
input_edit-list_disabled is a 1-bit flag; when set to 1, it indicates that the edit lists of input tracks are ignored and the derived track operates on the composition timeline of its input tracks. Otherwise, the default behaviour for the derived track is to operate on the presentation timeline (i.e., after the application of edit lists) of its input tracks.

input_post_decoder_disabled is a 1-bit flag; when set to 1, it indicates that the post-decoder operations of input tracks and items are ignored and the derived track operates on the input tracks and items before applying any post-decoder operations associated with its input tracks or items.

Other parameters have the same meaning as described above.

In an alternative embodiment, rather than using a single flag that globally applies to all inputs, a signalling is added per inputs using a bit mask. Each bit in the bit mask corresponds to a different input in the order listed in the TrackReferenceTypeBox of type 'dtrk'.

An example of syntax for VisualDerivationDefault ('dtrD') according to this alternative embodiment is as follows:

```
aligned(8) class VisualDerivationDefault( ) extends FullBox ('dtrD',
version = 0, flags = 0) {
    unsigned int(16) input_count;
    unsigned int(floor((input_count+7)/8))*8) input_edit-list_flags;
    unsigned int(floor((input_count+7)/8))*8)
    input_post_decoder_flags;
    unsigned int(8) max_intermediate_output;
    unsigned int(2) default_first_derivation_input;
    unsigned int(2) derivation_method;
    unsigned int(4) reserved;
}
```

Where input_edit_list_flags is a bit mask that indicates if edit lists of input tracks shall be ignored and if the derived track operates on the composition timeline or presentation timeline of input tracks. If the $N^{th}$ bit (1-based) is set to 1, that means edit lists are ignored for the input declared in the $N^{th}$ entry (1-based) of the TrackReferenceTypeBox of type 'dtrk', and the derivation operation operates on the composition timeline of this input. Otherwise the derivation operates on the presentation timeline of this input.

input_post_decoder_flags is a bit mask that indicates if post-decoder operations of input tracks or items shall be ignored before applying the derivation operation. If the $N^{th}$ bit (1-based) is set to 1, that means post-decoder operations are ignored for the input declared in the $N^{th}$ entry (1-based) of the TrackReferenceTypeBox of type 'dtrk'. Otherwise the derivation operation operates after applying the post-decoder operations associated with this input.

Bits in the masks are assigned from least-significant (first input) upwards.

Other parameters have the same meaning as described above.

In an alternative embodiment, above single bit approach or bit-mask approach can be combined, for instance using the first approach for edit-list related signalling and the second approach for post-decoder related signalling and vice versa.

In an alternative or complementary embodiment, for more flexibility similar signalling is defined per derivation operation either in derived track's sample entry or samples by adding similar signalling in VisualDerivationInputs('dinp') as follows:

```
aligned(8) class Visual Derivation Inputs extends FullBox ('dinp',
version = 0, flags){
    unsigned int(16) input_count;
    unsigned int(floor((input_count+7)/8))*8)
    input_post_decoder_flags;
    unsigned int(floor((input_count+7)/8))*8) input_edit_list_flags;
    unsigned int(floor((input_count+7)/8))*8) input_present_flags;
    unsigned int(16) track_reference_index[ ];
    // if the Nth bit is the highest bit set in the flags, then there must
    // be N entries in the reference array
}
```

Where input_edit_list_flags is a bit mask that indicates if edit lists of input tracks shall be ignored and if the derived track operates on the composition timeline or presentation timeline of input tracks. If an input is present in the box (indicated by the corresponding bit in the input_present_flags) and the corresponding bit in the input_edit_list_flags is set to 1, that means edit lists are ignored for this input, if any, and the derivation operation operates on the composition timeline of this input. Otherwise the derivation operation operates on the presentation timeline of this input. If an input is marked as not present in the box, the value of the corresponding bit in input_edit_list_flags has no meaning.

input_post_decoder_flags is a bit mask that indicates if post-decoder operations of input tracks or items shall be ignored before applying the derivation operation. If an input is present in the box (indicated by the corresponding bit in the input_present_flags) and the corresponding bit in the input_post_decoder_flags is set to 1, that means post-decoder operations are ignored for this input, if any. Otherwise the derivation operation operates after applying the post-decoder operations associated with this input. If an input is marked as not present in the box, the value of the corresponding bit in input_post_decoder_flags has no meaning.

Bits in the masks are assigned from least-significant (first input) upwards.

Other parameters have the same meaning as described above.

Each bit in the input_edit_list_flags or input_post_decoder_flags takes the value defined in that sample, if any (i.e. the corresponding bit in input_present_flags is set to 1), or else the value defined in the sample entry, if any, or the value 0 per default (i.e., edit lists or post_decoder operations on the input are applied).

In some embodiments, only the indication on edit lists or indication on post-decoder operation is included in the derived track. Syntax for these embodiments may correspond to the above examples where either the edit-list information or the post-decoder information is omitted.

The elements to be taken into account when dealing with the size of samples of a track comprises the matrix and the pixel aspect ratio. A track may be provided with a matrix that defines a transformation to be applied to samples after decoding. The pixel aspect ratio defines a ratio that is to be applied on the dimensions, width and height, of the sample before presentation. In some embodiments, it might be desirable to finely specify the size of the resulting samples in a derived track, particularly when the size of input samples or items does not match.

In another aspect of embodiments, in ISOBMFF, the size of output visual samples (width and height) is usually documented in both track header TrackHeaderBox('tkhd') and sample entry (VisualSampleEntry):

In TrackHeaderBox, width and height document the track's visual presentation size (including the final aspect ratio) before applying any transformation represented by the matrix.

In VisualSampleEntry, width and height document the pixel counts that the codec will deliver, this enables the allocation of buffers (do not take into account pixel aspect ratio).

For items, the width and height are documented in an item property ImageSpatialExtentsProperty('ispe').

There are cases where there is a size mismatch between input tracks or items sizes and sizes documented in derived tracks. This is also a concern addressed by some embodiments of this invention.

In an embodiment, the input tracks and items are always resized to match the width and height documented in the derived track's VisualSampleEntry and possibly converted to pixel aspect ratio documented in derived track's PixelAspectRatioBox if present. In other words, derivation operations apply to input images with the same pixel aspect ratio than derived track's samples. Input images shall be scaled to the same pixel aspect ratio than derived track. If a derived track has a pixel aspect ratio different than 1:1, it shall contain a PixelAspectRatioBox documenting its pixel aspect ratio.

When necessary, the input tracks and items are resized (without modifying their original width/height aspect ratio) to match the width and height documented in the derived track's VisualSampleEntry. If differences in width/height aspect ratio result in empty pixel area around resized input images, this empty pixel area is filled according to the value of default_first_derivation_input parameter (black, white or grey pixels). In a variant, PixelAspectRatioBox is forbidden in derived tracks (width and height in derived track's TrackHeaderBox are always equal to width and height respectively in derived track's sample entry) and all input track samples and input items are used by derivation operations after applying any transformation due to pixel aspect ratio differences as defined in the input track or the input item.

In an alternative embodiment, the derived track does not explicitly specify the width and height of derived output samples in either its TrackHeaderBox or VisualSampleEntry. Value 0 in both VisualSampleEntry width and height and in both TrackHeaderBox width and height indicates that the actual size is defined by the external context or by reusing width and height of another track according to the value of derivation_output_size_flags parameter.

A new 2-bit flag parameter may be defined in the configuration parameters of the derived track either in the DerivedTrackConfigRecord('dtrC') or in the VisualDerivationDefault('dtrD') or as box flags depending on embodiments in order to indicate how to determine the size of derived output samples.

Below is an example of syntax for VisualDerivationDefault('dtrD'):

```
aligned(8) class VisualDerivationDefault( ) extends FullBox ('dtrD',
version = 0, flags = 0) {
    unsigned int(8) max_intermediate_output;
    unsigned int(2) default_first_derivation_input;
    unsigned int(2) derivation_method;
    unsigned int(1) input_edit_list_disabled;
    unsigned int(1) input_post_decoder_disabled;
    unsigned int(2) derivation_output_size_flags;
}
```

Where
derivation_output_size_flags indicates the method to use to determine the size of derived output samples:
  When equal 0, the size of output samples is determined by width and height values defined in sample entry and TrackHeaderBox of the derived track according to usual rules in ISO/IEC 14496-12 (default behaviour).
  When equal 1, the size of output samples is the minimum size of all input items and input tracks (considering TrackHeaderBox width and height).
  When equal 2, the size of output samples is the maximum size of all input items and input tracks (considering TrackHeaderBox width and height).
  When equal 3, the size of output samples corresponds to the size of the input item or the input track (considering TrackHeaderBox width and height) provided by a track reference of type 'size'.

A track reference of type 'size' may correspond to a TrackReferenceTypeBox with reference_type equal to 'size' in the TrackReferenceBox ('tref') in the TrackBox ('traf') corresponding to the derived track, as illustrated in FIG. 2 with box tref. When necessary, sample from input tracks and input items are resized to be compliant with the size of output samples as signalled by derivation_output_size_flags.

Other parameters have the same meaning as described above.

Figure 6:
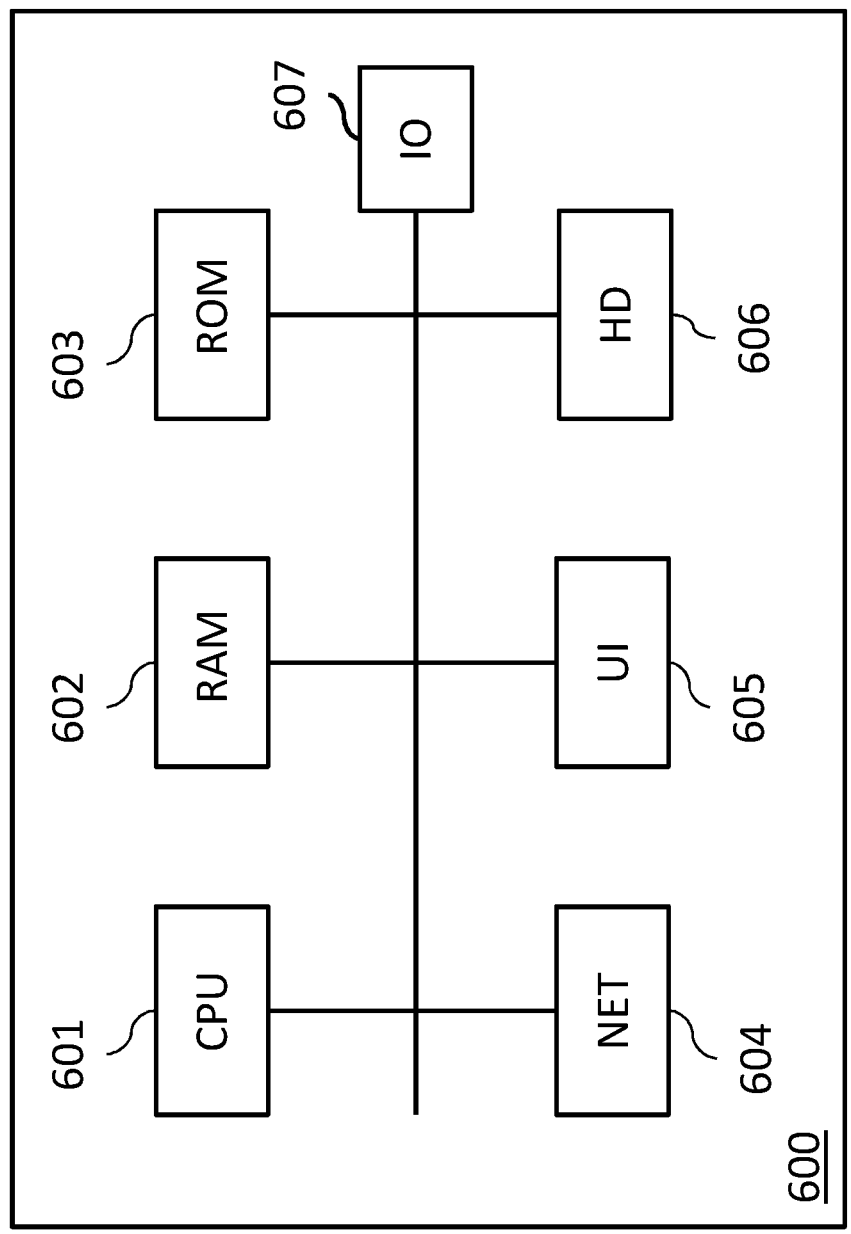
FIG. 6 is a schematic block diagram of a computing device for implementation of one or more embodiments of the invention.

FIG. 6 is a schematic block diagram of a computing device 600 for implementation of one or more embodiments of the invention. The computing device 600 may be a device such as a micro-computer, a workstation or a light portable device. The computing device 600 comprises a communication bus connected to:
  a central processing unit 601, such as a microprocessor, denoted CPU;
  a random access memory 602, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port, for example;
  a read-only memory 603, denoted ROM, for storing computer programs for implementing embodiments of the invention;
  a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 601;
  a user interface 605 may be used for receiving inputs from a user or to display information to a user;
  a hard disk 606 denoted HD may be provided as a mass storage device;
  an I/O module 607 may be used for receiving/sending data from/to external devices such as a video source or display.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the hard disk (HD) 606, for example. Such a software application, when executed by the CPU 601, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Fiel4Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of generating a data file, wherein the method comprises:
    obtaining a derived track comprising at least one derived sample, each derived sample comprising a sequence of derivation operations to be performed on a list of at least one input;
    wherein the derived track comprises an entry value having its most significant bit set to 1 for indicating that an input of a derivation operation is the output of one among the previous derivation operations in the sequence, the remaining bits of the entry value corresponding to the index of the derivation operation used as input among the previous derivation operations; and
    generating the file comprising the derived track and a reference to the at least one input.

2. The method of claim 1, wherein the derived track comprises a derived track configuration data structure listing a set of derivation operations that can be used by the derived samples.

3. The method of claim 2, wherein the derived track configuration data structure belongs to a sample entry of type 'dtrk'.

4. The method of claim 3, wherein the derived track comprises data for signalling whether an input of a derivation operation is defined in the derived track configuration data structure, or in the derived sample.

5. The method of claim 1, wherein the derived track comprises data for signalling whether an input of a derivation operation of the sequence corresponds to an output of a previous derivation operation, or corresponds to an input of the list.

6. The method of claim 1, wherein the derived track comprises data for signalling a maximum number of intermediate output(s) resulting from the performing of derivation operations.

7. The method of claim 1, wherein the at least one input is an input sample belonging to an input track, or an input image item.

8. The method of claim 1, wherein the index is a 1-based index of the previous derivation operation relatively to the derivation operation.

9. A method of generating of output samples, wherein the method comprises:
    obtaining a file comprising a derived track comprising at least one derived sample, each derived sample comprising a sequence of derivation operations to be performed on a list of at least one input, the file comprising a reference to the at least one input;
    wherein the derived track comprises an entry value having its most significant bit set to 1 for indicating that an input of a derivation operation is the output of one among the previous derivation operations in the sequence, the remaining bits of the entry value corresponding to the index of the derivation operation used as input among the previous derivation operations; and
    generating the output samples by performing the sequence of derivation operations on the list of at least one input.

10. The method of claim 9, wherein the index is a 1-based index of the previous derivation operation relatively to the derivation operation.

11. A device for generating a data file, wherein the device comprises circuitry configured for:
    obtaining a derived track comprising at least one derived sample, each derived sample comprising a sequence of derivation operations to be performed on a list of at least one input;
    wherein the derived track comprises an entry value having its most significant bit set to 1 for indicating that an input of a derivation operation is the output of one among the previous derivation operations in the sequence, the remaining bits of the entry value corresponding to the index of the derivation operation used as input among the previous derivation operations; and
    generating the file comprising the derived track and a reference to the at least one input.

12. The method of claim 11, wherein the index is a 1-based index of the previous derivation operation relatively to the derivation operation.

13. A device for generating of output samples, wherein the device comprises circuitry configured for:
    obtaining a file comprising a derived track comprising at least one derived sample, each derived sample comprising a sequence of derivation operations to be performed on a list of at least one input, the file comprising a reference to the at least one input;
    wherein the derived track comprises an entry value having its most significant bit set to 1 for indicating that an input of a derivation operation is the output of one among the previous derivation operations in the sequence, the remaining bits of the entry value corresponding to the index of the derivation operation used as input among the previous derivation operations; and generating the output samples by performing the sequence of derivation operations on the list of at least one input.

14. The method of claim 13, wherein the index is a 1-based index of the previous derivation operation relatively to the derivation operation.

15. A non-transitory computer-readable storage medium storing instructions of a computer program for implementing a method according to claim 1.

16. A non-transitory computer-readable storage medium storing instructions of a computer program for implementing a method according to claim 9.

\* \* \* \* \*